United States Patent
Lehman et al.

(10) Patent No.: US 7,147,215 B2
(45) Date of Patent: Dec. 12, 2006

(54) STRIP FOR PACKING MODULE, CORRESPONDING MODULE AND COLUMN

(75) Inventors: Jean-Yves Lehman, Maisons-Alfort (FR); Etienne Werlen, Paris (FR); Gilles Lebain, Thiais (FR)

(73) Assignee: L'Air Liquide, Societe Anonyme a Directoire et Conseil de Surveillance pour l'Etude et l'Exploitation des Procedes Georges Georges Claude, Paris (FR)

( * ) Notice: Subject to any disclaimer, the term of this patent is extended or adjusted under 35 U.S.C. 154(b) by 0 days.

(21) Appl. No.: 10/498,614

(22) PCT Filed: Dec. 6, 2002

(86) PCT No.: PCT/FR02/04214

§ 371 (c)(1),
(2), (4) Date: Jun. 10, 2004

(87) PCT Pub. No.: WO03/049854

PCT Pub. Date: Jun. 19, 2003

(65) Prior Publication Data

US 2005/0040549 A1 Feb. 24, 2005

(30) Foreign Application Priority Data

Dec. 10, 2001 (FR) ................................ 01 15933

(51) Int. Cl.
*B01F 3/04* (2006.01)
(52) U.S. Cl. .............................. 261/112.2; 261/DIG. 72
(58) Field of Classification Search .............. 261/112.2, 261/DIG. 72
See application file for complete search history.

(56) References Cited

U.S. PATENT DOCUMENTS

| | | | | |
|---|---|---|---|---|
| 3,374,994 A | * | 3/1968 | Greer ........................ | 261/112.2 |
| 4,296,050 A | * | 10/1981 | Meier ........................ | 261/112.2 |
| 4,957,276 A | * | 9/1990 | Garrish ..................... | 261/112.1 |
| 5,124,086 A | * | 6/1992 | Schultz ..................... | 261/112.2 |
| 5,167,879 A | * | 12/1992 | Streng ....................... | 261/112.2 |
| 5,876,638 A | * | 3/1999 | Sunder et al. ........... | 261/112.2 |
| 6,206,349 B1 | * | 3/2001 | Parten ....................... | 261/112.2 |
| 6,212,907 B1 | | 4/2001 | Billingham et al. | |
| 6,783,119 B1 | * | 8/2004 | Zich et al. ................ | 261/112.2 |
| 2003/0047821 A1 | | 3/2003 | Zich et al. | |

FOREIGN PATENT DOCUMENTS

| | | |
|---|---|---|
| DE | 29 21 270 A1 | 11/1980 |
| DE | 100 01 694 A1 | 7/2001 |
| EP | 1 078 684 A1 | 2/2001 |
| WO | WO 97 16247 | 10/1996 |

OTHER PUBLICATIONS

International Search Report for PCT/FR02/04214.

* cited by examiner

*Primary Examiner*—Scott Bushey
(74) *Attorney, Agent, or Firm*—Elwood Haynes

(57) ABSTRACT

A corrugated strip made of sheet material, which may be used in a packing module. The peaks and the troughs of the strip, when viewed in a side view, define lines which have a general sloping direction relative to the direction the fluid flow. Each strip includes a spanning zone and a transition zone. In the transition zone, each peak/trough line extends inside a specific area centered on a curve which extends tangentially from the peak/trough line of the spanning zone. The structured interface region between the spanning and transition zones helps to reduce head loss across the strip.

15 Claims, 3 Drawing Sheets

STRIP FOR PACKING MODULE, CORRESPONDING MODULE AND COLUMN

BACKGROUND

The present invention relates to a corrugated strip made of sheet material, especially plastically deformed sheet metal, for a packing module for treating a fluid, of the type defining flow channels for the fluid and comprising a spanning region, the channels of which define, in side view, peak/trough lines having a general direction inclined to a general flow direction of said fluid, the strip furthermore including at least one transition region adjacent to the spanning region, the direction of the peak/trough lines of which transition region progressively approaches the general flow direction of said fluid.

The term "packing" is understood to mean a device intended for mixing a phase and/or for bringing several phases flowing cocurrently or countercurrently into contact with one another. A heat and/or mass exchange and/or a chemical reaction may in particular take place in the packing. One particular application of the invention lies in the columns for separating gas mixtures, especially air distillation columns.

Mentioned in the prior art are air distillation installations comprising cross-corrugated packing modules, which are also called packs. The modules comprise corrugated strips or metal sheets placed vertically in a parallel fashion, the corrugations of which sheets are oblique with respect to a general fluid flow direction in the installation, and are inclined alternately, generally crossed at 90°, from one sheet to another.

The packing modules are slipped into the distillation column so that the sheets of one module are angularly offset with respect to the sheets of an adjacent module about the axis of the column, generally by 90° from one module to another.

During use, the gas is constrained to change direction at such an angle in order to flow from one module to another, with a corresponding head loss at this location. Such a head loss causes accumulation of liquid in the lower region of the upper module and flooding of the column at this location, whereas the central portion of the modules has not yet reached its flooding point. This phenomenon reduces the treatment capacity of the column.

To reduce this effect, it has been proposed in the prior art to use packing modules having a structured interface region.

Such a packing module is disclosed, for example, in WO-A-97/16247.

In this module, the packing strips comprise, in their marginal regions, corrugations with curved peaks that extend, along the edge facing an adjacent module, parallel to the general flow direction of the fluids.

These curved corrugations join this edge of the strip to the corrugations lying in the spanning region of the module, which lie obliquely relative to the general flow direction of the fluids.

However, the packing strips disclosed in the aforementioned WO-A-97/16247 still generate a substantial head loss in the interface regions of the modules.

SUMMARY

The object of the invention is to propose a packing module whose head loss is further reduced.

For this purpose, the subject of the invention is a corrugated strip of the aforementioned type, characterized in that each peak/trough line of the transition region, in side view, lies within a defined area centered on a curve that tangentially extends the peak/trough line of the spanning region and the radial width of which area is 10% of the corresponding radius of curvature of the curve, and in that the radius of curvature of the curve is at any point greater than 1.5 times, preferably greater than 1.6 times, the hydraulic diameter of a channel.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

According to particular embodiments, the strip according to the invention may comprise one or more of the following features:

- the radius of curvature of the curve is greater than three times the hydraulic diameter of a channel;
- the radius of curvature of the curve is less than five times the hydraulic diameter of a channel;
- the curve is a circular arc;
- the center of the circular arc is located on the edge of the strip or on an extension of this edge;
- the curve comprises at least two circular arcs of different radii of curvature, the circular arcs being joined together in the order of increasing value of their radius of curvature starting from the edge of the strip;
- the edge direction of the peak/trough lines at the point of their intersection with the edge of the strip is substantially the general direction of flow of said fluid;
- the peak/trough lines of the transition region consist of at least two straight segments especially of identical lengths; and
- the peak/trough lines of the transition region coincide with the curve.

The subject of the invention is also a packing module for a material and/or heat exchange column, characterized in that it comprises a stack of strips as defined above, with the general directions of their peak/trough lines of their spanning region reversed from one strip to another.

According to one particular embodiment of the module, the packing density is greater than 300 $m^2/m^3$, and preferably greater than 400 $m^2/m^3$.

The subject of the invention is also a cryogenic distillation column, especially for the distillation of air, characterized in that it comprises at least one packing module as defined above.

Figure 1:
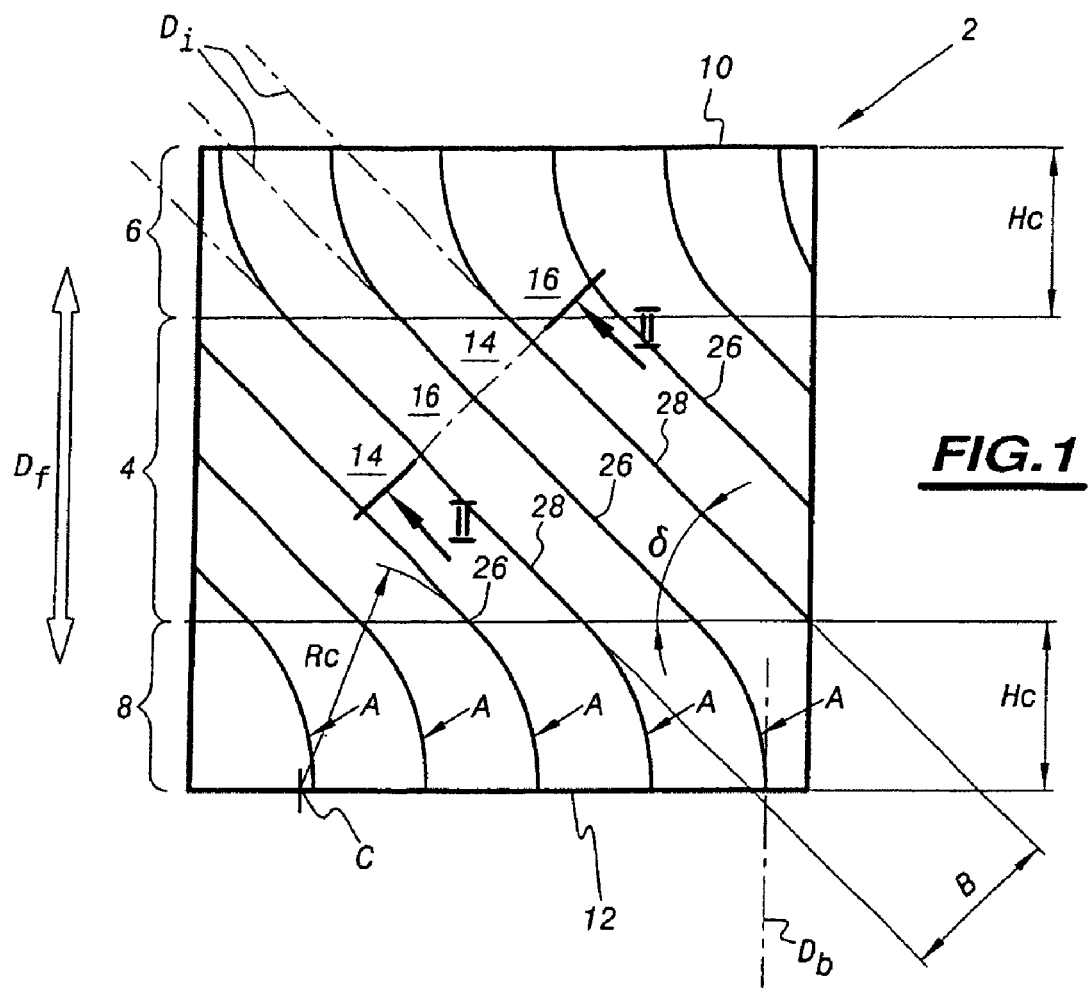
FIG. 1 illustrates one embodiment of a packing strip, as seen in a side view.

FIG. 1 shows, in side view, a packing module 2 according to the invention. The packing module 2 is intended to be mounted in a fluid treatment column with a vertical central axis (not shown). During operation of the column, fluid flows over the surface of the strip 2 in a general fluid flow direction $D_f$, which in this case is vertical. The packing strip 2 is manufactured from a smooth sheet-metal strip and is plastically deformed by bending.

The packing strip 2 has a corrugated spanning region 4 to which corrugated upper 6 and lower 8 transition regions join along the direction $D_f$. Each transition region 6, 8 terminates in a horizontal edge 10, 12. In the mounted state of the strip 2, the transition regions 6, 8 are adjacent neighboring packing modules, which consist of strips which are similar but angularly offset about the central axis of the column.

Figure 2:
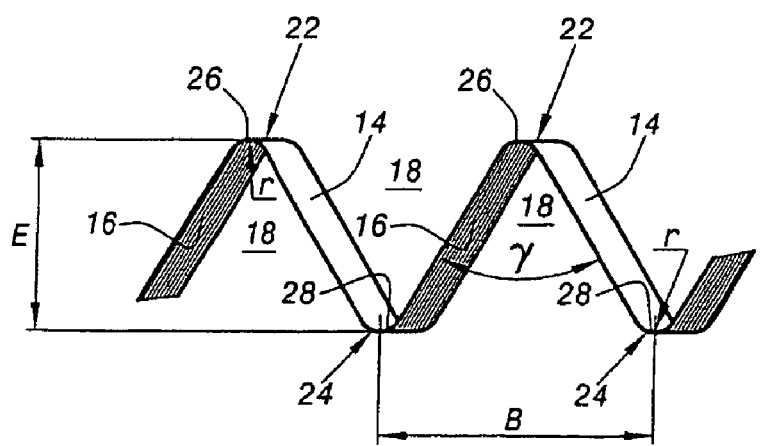
FIG. 2 illustrates a larger scale rendition of the sectional view II—II of FIG. 1.

FIG. 2 shows a sectional view of the spanning portion 4 on the line II—II of FIG. 1. The strip 2 consists of a succession of flat surfaces 14, 16 that are inclined to the plane of FIG. 1, alternately to the front and to the rear. Two neighboring surfaces 14, 16 form a fluid flow channel 18 between them. Each channel 18 has an approximately triangular cross section and is closed along two sides and open along the third side. The surfaces of a channel 14, 16 make a bending angle γ, which in this case is 60°. The channels 18, and therefore the strip, have a thickness E. The flat surfaces 14, 16 have curved linking areas 22, 24 that link two adjacent surfaces 14, 16. These linking areas have a radius of curvature r. The linking areas 22, 24 form, in side view (FIG. 1), peak 26 and trough 28 lines. In side view, two neighboring peak lines 26 or two neighboring trough lines 28 lie parallel to each other and are separated by a distance B, which is the pitch of the corrugation. The peak 26/trough 28 lines of the spanning region 4 are straight and lie along a direction $D_i$. This direction makes an angle δ=45° to the edges 10, 12 of the strip and to the direction $D_f$. The angle δ is generally between 30° and 60°.

Unlike the spanning region, the channels 18 of the transition regions 6, 8 are curved. More precisely, the peak 26/trough 28 lines of the channels 18 lie approximately in the direction $D_i$ in an area joined to the spanning region 4 and progressively change their inclination toward an edge inclination direction $D_b$ at the location of the edge 10, 12 of the strip. In the present embodiment, each peak 26/trough 28 line has, in the transition regions, in side view, the shape of a circular arc A of radius Rc. The center C of each circular arc A is located on the edge 10, 12 of the strip or on an extension of said edge, in such a way that the direction $D_b$ is identical to the direction $D_f$. Each circular arc A joins a peak 26/trough 28 line of the spanning region 4 tangentially. Each of the upper 6 and lower 8 transition regions has a height Hc, measured along the direction $D_f$. The height Hc as a function of δ is Hc=Rc×cosδ.

The hydraulic diameter of each channel 18 of the spanning region 4 is:

$$Dh = \frac{4 \times \text{channel cross section}}{\text{channel perimeter}}.$$

If each channel 18 is defined by two V-shaped surfaces 14, 16, that is to say neglecting the radius r, the hydraulic diameter of a channel (18) is:

$$Dh = B \times \cos(\gamma/2).$$

The radius Rc of each arc A is greater than 1.5 times the hydraulic diameter Dh. In practice, it is between 1.6Dh and 5Dh, and is preferably about 3Dh.

Figure 3:
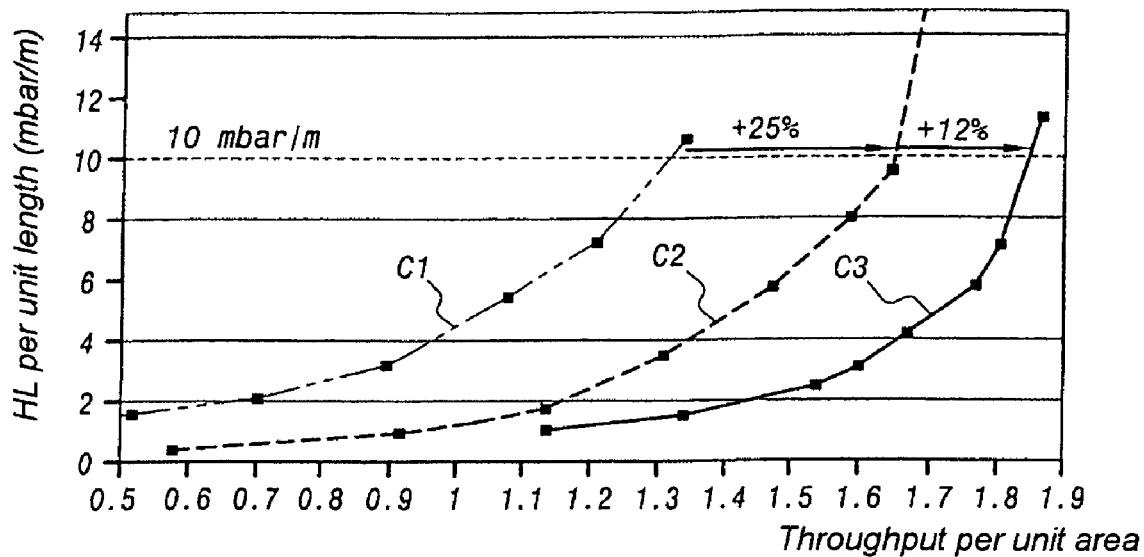
FIG. 3 illustrates throughput measurements made for particular packing modules.

FIG. 3 shows curves comparing the capacities of two packings of the prior art and one packing according to the invention. Each packing has a density of 500 m²/m³. The angle of inclination of the channels in the spanning region δ is 45°. Plotted on the x-axis is the maximum throughput per unit area of the gas, plotted on the y-axis is the head loss per unit length.

Curve C1 shows the capacity of a first conventional packing, with no transition regions, namely a packing consisting of corrugated strips that are formed only by a spanning region. Curve C2 indicates the capacity of a second packing, having two, lower and upper, transition regions, the Rc/Dh ratio of which is equal to 1. For a head loss of 10 mbar/m, a 25% increase in capacity over the conventional packing is observed.

Curve C3 indicates the capacity of a packing according to the invention, the Rc/Dh ratio of which is 3. For a head loss of 10 mbar/m, the capacity is further increased by 12% over the second packing.

Figure 4:
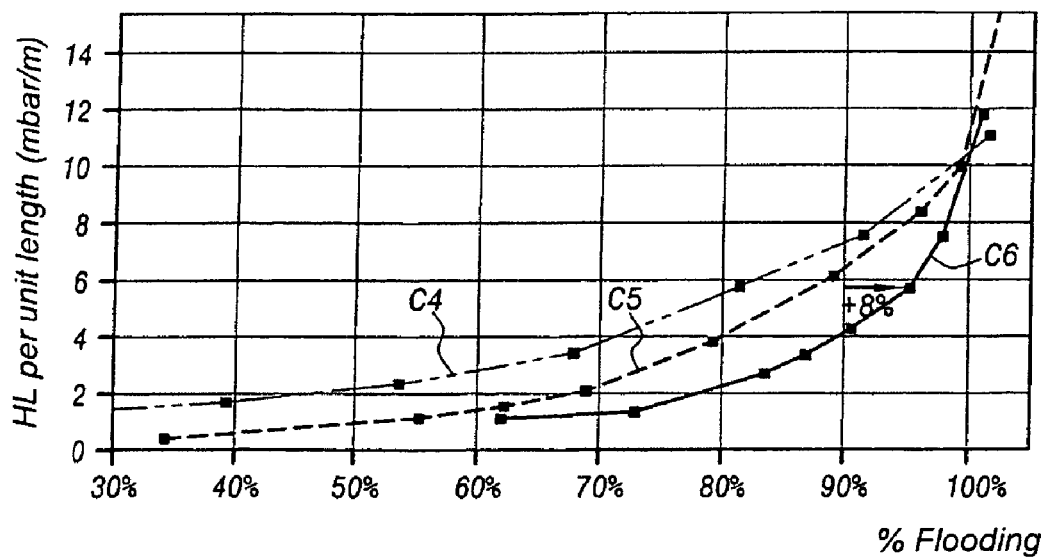
FIG. 4 illustrates flooding measurements made for particular packing modules.

FIG. 4 shows curves comparing the behavior of the aforementioned packings. Plotted on the x-axis is the degree of flooding of the packing, while plotted on the y-axis is the head loss per unit length.

Curve C4 shows the behavior of the conventional first packing. Curve C5 indicates the behavior of the second packing and curve C6 indicates the behavior of the third packing. For a head loss of 6 mbar/m, the capacity is increased by 8% for a packing with Rc/Dh=3, compared to a packing with Rc/Dh=1.

Figure 5:
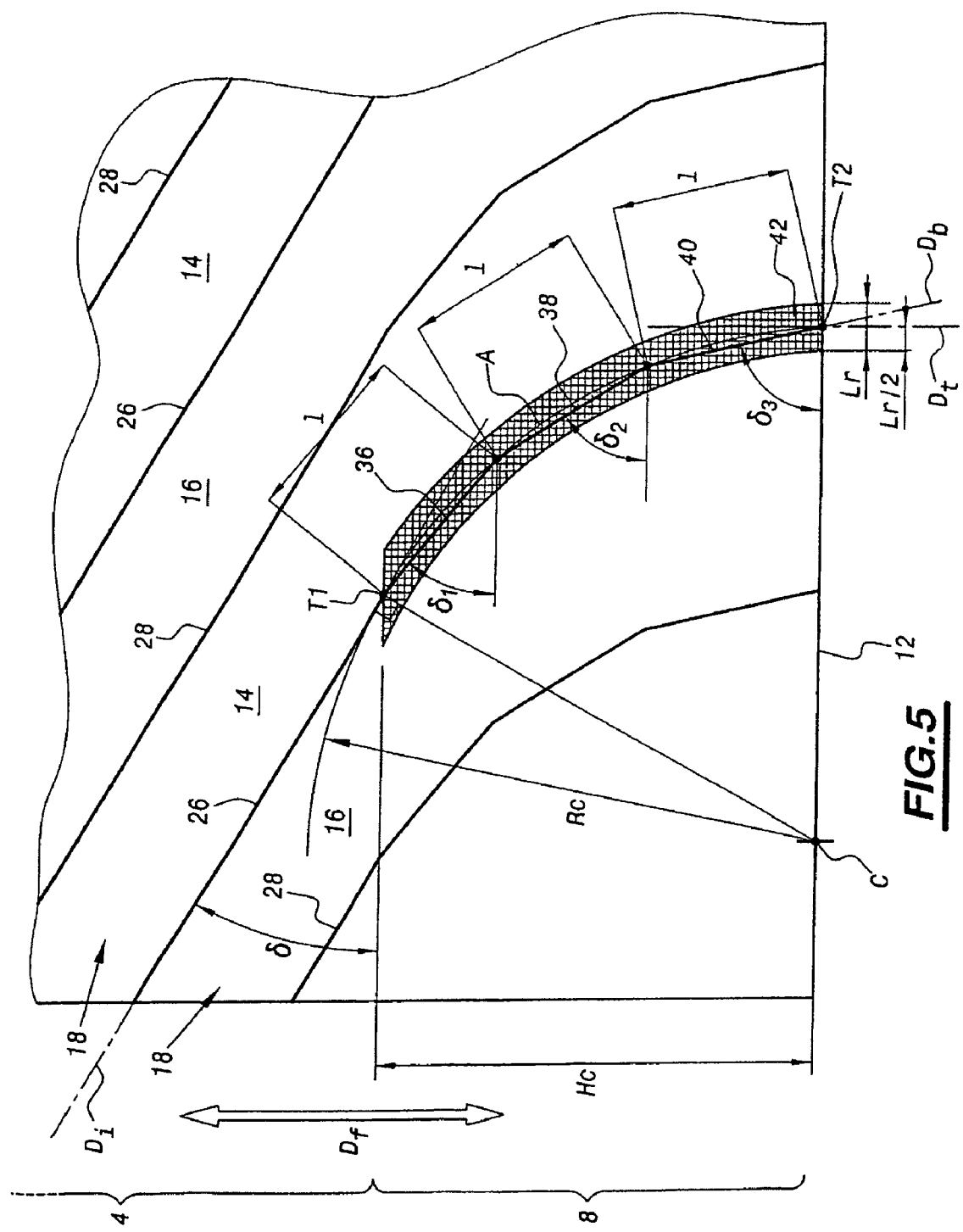
FIG. 5 illustrates a large scale rendition of another embodiment of a packing strip.

FIG. 5 shows a portion of a transition region of an alternative embodiment of a packing strip according to the invention.

Unlike the first embodiment, the angle of inclination δ of the peak 26/trough 28 lines of the spanning region 4 is 30°. Consequently, they are inclined at 60° to $D_f$. In addition, the peak 26/trough 28 lines in the transition region 8 are made up of three straight segments 36, 38, 40 of identical length l. The successive segments 36, 38, 40 are inclined, from the spanning region to the edge, by $\delta_1=39°$, $\delta_2=58°$ and $\delta_3=77°$ to the edge 12.

Each peak 26/trough 28 line of the strip 2 lies, in the transition region 8, within an area 42 that is defined as follows:

A curve in the form of a circular arc A joins the terminal point T1 of the peak 26/trough 28 line in question of the spanning region tangentially.

This circular arc A has a radius Rc of at least 1.5 times, preferably at least 1.6 times, the hydraulic diameter Dh of the channels 18 of the strip 4.

At the point of intersection T2 of the circular arc A with the edge 12, this circular arc has a tangential direction $D_t$ that is more inclined to the general flow direction $D_f$ of the fluid than the peak 26/trough 28 lines of the spanning region 4.

The area 42 has a radial width Lr that is 10% of the radius Rc. The area 42 is centered on the circular arc A, in such a way that it extends by 5%×Rc on either side of the circular arc A.

It should be noted that this circular arc A is the ideal line of curvature for a peak 26/trough 28 line lying within the area 42.

It has been observed that a packing module manufactured from a packing strip according to the invention exhibits an increased capacity.

The packing modules manufactured from strips according to the invention preferably have a packing density a of greater than 300 m²/m³ and preferably greater than 400 m²/m³.

It should be noted that the hydraulic diameter Dh can also be calculated approximately as a function of the packing density a according to the formula: Dh=4/a.

The modules comprising a stack of packing strips according to the invention are, for example, used in cryogenic distillation columns, especially for air distillation.

As a variant, the curve defining the area 42 may have a variable radius of curvature, especially one that decreases from the spanning region of the strip. In particular, it may consist of a plurality of circular arcs of different radii of curvature. For example, it may consist of two circular arcs having a radii of curvature Rc of 1.5Dh and 2Dh. Preferably, the circular arcs extend from the edge in the increasing order of their radii of curvature.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. An apparatus which may be used for treating a fluid in a packing module comprising a corrugated strip of sheet material, said strip further comprising:
   a) flow channels for said fluid;
   b) a spanning region wherein said channels define spanning peak/trough lines with a general direction (Di) substantially opposed to a general flow direction (Df) of said fluid; and
   c) at least one transition region located adjacent to said spanning region and further comprising:
      1) said channels defining transition peak/trough lines with a direction that progressively approaches said general flow direction (Df) of said fluid;
      2) a curve (A) that said transition peak/trough lines substantially follow, said curve tangentially extending from said spanning peak/trough lines; and
      3) a radius of curvature (Rc) of said curve (A) that at any point is greater than about 1.5 times the hydraulic diameter (Dh) of said channel.

2. The apparatus of claim 1, wherein each transition peak/trough line lies within a defined area centered on said curve (A).

3. The apparatus of claim 2, wherein said area has a radial width (Lr) of about 10% of the corresponding radius of curvature (Rc).

4. The apparatus of claim 1, wherein said sheet material comprises metal which is plastically deformed.

5. The apparatus of claim 1, wherein said radius of curvature (Rc) of said curve (A) is greater than about three times said hydraulic diameter (Dh) of said channel.

6. The apparatus of claim 5, wherein said radius of curvature (Rc) of said curve (A) is greater than about 3 times said hydraulic diameter (Dh) and less than about five times said hydraulic diameter (Dh) of said channel.

7. The apparatus of claim 1, wherein said curve is a circular arc.

8. The apparatus of claim 7, wherein the center (C) of said circular arc is located on the edge of said strip or on an extension of the edge.

9. The apparatus of claim 1, wherein said curve (A) comprises at least two circular arcs of different radii of curvature, said arcs being joined together in the order of increasing value of their radius of curvature starting from the edge of said strip.

10. The apparatus of claim 1, wherein the edge direction ($D_b$) of said transition peak/trough lines at the point of their intersection with the edge of said strip is oriented in substantially the same said general direction of flow ($D_f$) as said fluid.

11. The apparatus of claim 1, wherein said transition peak/trough lines consist of at least two straight segments of identical lengths (l).

12. The apparatus of claim 1, wherein said transition peak/trough lines coincide with said curve (A).

13. An apparatus which may be used for a packing module in a material and/or heat exchange column comprising a stack of corrugated strips, said strips further comprising:
   a) flow channels for said fluid;
   b) a spanning region wherein said channels define spanning peak/trough lines with a general direction (Di) substantially opposed to a general flow direction (Df) of said fluid; and
   c) at least one transition region located adjacent to said spanning region and further comprising:
      1) said channels defining transition peak/trough lines with a direction that progressively approaches said general flow direction (Df) of said fluid;
      2) a curve (A) that said transition peak/trough lines substantially follow, said curve tangentially extending from said spanning peak/trough lines; and
      3) a radius of curvature (Rc) of said curve (A) that at any point is greater than about 1.5 times the hydraulic diameter (Dh) of said channel.

14. The apparatus of claim 13, wherein said general direction of said spanning peak/trough lines is reversed from one strip to another.

15. The apparatus of claim 13, wherein the packing density (a) of said stack is greater than about 300 $m^2/m^3$.

* * * * *